(12) United States Patent
Lin et al.

(10) Patent No.: US 9,223,005 B2
(45) Date of Patent: Dec. 29, 2015

(54) ELECTRONIC APPARATUS, METHOD AND SYSTEM FOR MEASURING LOCATION

(71) Applicant: Wistron Corporation, New Taipei (TW)

(72) Inventors: Yueh-Hsien Lin, New Taipei (TW); Chih-Kai Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 269 days.

(21) Appl. No.: 13/958,631

(22) Filed: Aug. 5, 2013

(65) Prior Publication Data

US 2014/0354410 A1    Dec. 4, 2014

(30) Foreign Application Priority Data

May 31, 2013   (TW) .............................. 102119360 A

(51) Int. Cl.
  *G01S 5/02*   (2010.01)
(52) U.S. Cl.
  CPC ............ *G01S 5/0284* (2013.01); *G01S 5/0263* (2013.01)
(58) Field of Classification Search
  CPC ............................ G01S 5/0284; G01S 5/0263
  See application file for complete search history.

(56) References Cited

U.S. PATENT DOCUMENTS

| | | | |
|---|---|---|---|
| 7,142,110 B2 * | 11/2006 | Schmidtberg et al. ... | 340/539.27 |
| 7,932,827 B2 * | 4/2011 | Chand et al. ............... | 340/572.1 |
| 2007/0096908 A1 | 5/2007 | Chu et al. | |
| 2013/0344886 A1 * | 12/2013 | Jarvis et al. ................ | 455/456.1 |
| 2014/0049393 A1 * | 2/2014 | Boyt et al. .................... | 340/540 |

FOREIGN PATENT DOCUMENTS

| | | |
|---|---|---|
| TW | 200718408 | 5/2007 |
| TW | M446614 | 2/2013 |

OTHER PUBLICATIONS

"Office Action of Taiwan Counterpart Application", issued on Nov. 26, 2014, p. 1-p. 7.

* cited by examiner

*Primary Examiner* — Brian Zimmerman
*Assistant Examiner* — Sara Samson
(74) *Attorney, Agent, or Firm* — Jianq Chyun IP Office

(57) ABSTRACT

An electronic apparatus, a method and a system for measuring a location are provided. A motion information is obtained according to a moving process of the electronic apparatus. And in the moving process, a displacement vector from a first sensing point to a second sensing point is calculated according to the motion information when an identification tag is sensed by the electronic apparatus, for obtaining a relative location of the first sensing point and the second sensing point.

9 Claims, 5 Drawing Sheets

ELECTRONIC APPARATUS, METHOD AND SYSTEM FOR MEASURING LOCATION

CROSS-REFERENCE TO RELATED APPLICATION

This application claims the priority benefit of Taiwan application serial no. 102119360, filed on May 31, 2013. The entirety of the above-mentioned patent application is hereby incorporated by reference herein and made a part of this specification.

BACKGROUND

1. Technical Field

The invention relates to a technique for estimating location. Particularly, the invention relates to an electronic apparatus capable of measuring a location of an object in a three-dimensional (3D) space, and a method for measuring location and a system thereof.

2. Related Art

Presently, an object identification technique has been widely applied in different domains of logistics management and control, warehouse management and design of interactive play equipment, etc. The object identification technique is, for example, a near field communication (NFC), or a radio frequency identification (RFID) system, etc.

In the above techniques, only a range of a signal can be estimated through signal attenuation, though a direction source of the signal cannot be determined. Therefore, application of these techniques in positioning is limited. Current solutions under development mainly include "radio frequency (RF) triangulation" and "RF fingerprinting". However, according to the above solutions, a plurality of signal read/write devices have to be emplaced in a selected area, and meanwhile problems such as signal scattering, multiple paths and signal attenuation, etc. are encountered, and these factors directly influence implementation cost, an application range and positioning accuracy.

SUMMARY

The invention is directed to an electronic apparatus, a method and a system for measuring location, by which a location of an object in a three-dimensional (3D) space is measured.

The invention provides a method for measuring location, which includes following steps. Motion information is obtained according to a moving process of an electronic apparatus. In the moving process, an identification tag is sensed by the electronic apparatus, where the identification tag is set in an object. A displacement vector from a first sensing point to a second sensing point is calculated according to the motion information when the identification tag is sensed, so as to obtain a relative location of the first sensing point and the second sensing point.

The invention provides an electronic apparatus including a motion sensing module, an object identification module and a processing unit. The processing unit is coupled to the motion sensing module and the object identification module. The motion sensing module is configured to obtain motion information according to a moving process. The object identification module is configured to determine whether an identification tag is sensed, where the identification tag is set in an object. Moreover, in the moving process of the electronic apparatus, when the object identification module senses the identification tag, the processing unit calculates a displacement vector from a first sensing point to a second sensing point according to the motion information, so as to obtain a relative location of the first sensing point and the second sensing point.

The invention provides a location measuring system includes a plurality of objects and an electronic apparatus. The objects are distributed in a three-dimensional space and are respectively configured with an identification tag. The electronic apparatus includes a motion sensing module, an object identification module and a processing unit. The processing unit is coupled to the motion sensing module and the object identification module. The motion sensing module is configured to obtain motion information according to a moving process. The object identification module is configured to determine whether the identification tag is sensed, where the identification tag is set in an object. Moreover, in the moving process of the electronic apparatus, when the object identification module senses the identification tag, the processing unit calculates a displacement vector from a first sensing point to a second sensing point according to the motion information, so as to obtain a relative location of the first sensing point and the second sensing point.

According to the above descriptions, an object identification technique and a motion sensing technique are combined to measure a location of the object in the 3D space, which is not susceptible to signal interference, and is suitable for flexible configuration.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
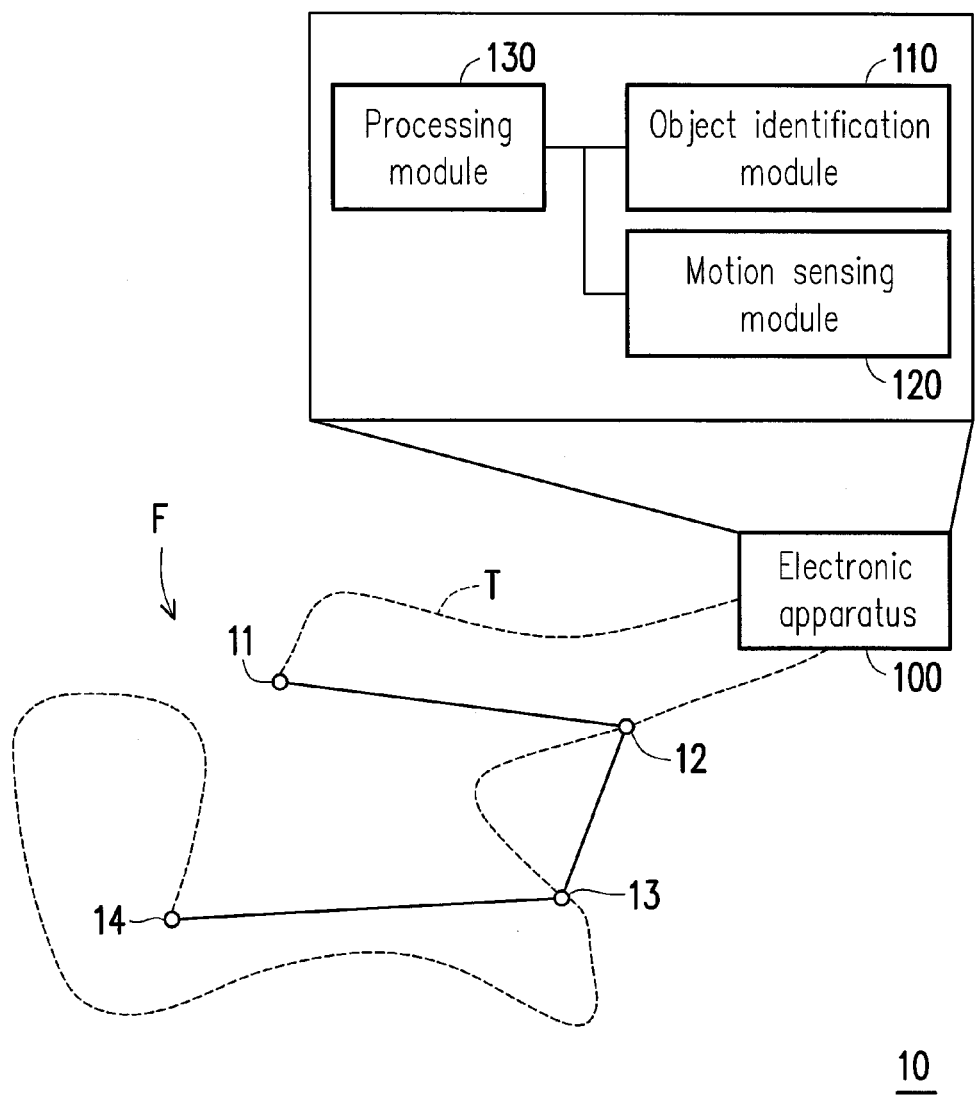
FIG. 1 is a schematic diagram of a location measuring system according to the first embodiment of the invention.

FIG. 1 is a schematic diagram of a location measuring system according to the first embodiment of the invention. The location measuring system 10 includes an electronic apparatus 100 and a plurality of objects. Here, objects 11-14 in a three-dimensional (3D) field F are taken as an example for descriptions. In other embodiments, the number of the objects and configuration locations thereof are not limited. The objects 11-14 are respectively configured with an identification tag. For example, an object identification system can be used to set the corresponding identification tag for each of the objects. The object identification system includes an object coding system and an object marking system. The object coding system codes an attribute (for example, name, type, shape, size, color, etc.) of each object into an object identification code. The object marking system writes each of the object identification codes into different identification tags, and combines each of the identification tags with the corresponding object.

The electronic apparatus 100 moves in the field F, and senses the identification tags of the objects 11-14 to estimate locations of the objects 11-14. The electronic apparatus 100 includes an object identification module 110, a motion sensing module 120 and a processing unit 130. The processing unit 130 is coupled to the object identification module 110 and the motion sensing module 120.

The object identification module 110 is configured to determine whether the identification tag is sensed. For example, the identification tag is a radio frequency identification (RFID) tag, and the object identification module 110 is a RFID reader. A RFID system is a non-contact automatic identification system, which transmits identification data by using radio waves, and one RFID system includes RFID tags and a RFID reader.

The motion sensing module 120 is configured to obtain motion information according to a moving process of the electronic apparatus. The motion sensing module 120 is, for example, one of a 3D accelerator, a gravity sensor and a gyroscope, or a combination thereof.

The processing unit 130 is, for example, a central processing unit (CPU) or a programmable microprocessor. In the moving process of the electronic apparatus 100, the processing unit 130 calculates a moving track T of the electronic apparatus 100 according to the motion information obtained by the motion sensing module 120. Moreover, when the object identification module 110 senses the identification tag of the object, the processing unit 130 calculates a displacement vector from a first sensing point to a second sensing point according to the motion information, so as to obtain a relative location of the first sensing point and the second sensing point. The first sensing point is, for example, an initial location of the electronic apparatus 100, or a location where the identification tag is previously sensed, and the second sensing point is, for example, a location where the identification tag is currently sensed. Moreover, the initial location can be determined by a user, or can be a coordinate location obtained through a global positioning system (GPS).

Moreover, in other embodiments, tasks handled by the processing unit 130 can be delivered to a cloud server. For example, only the processing unit 130 of a lowest level and a connection unit are configured in the electronic apparatus 100, where the connection unit is used to connect a network to deliver the related data to the cloud server.

Figure 2:
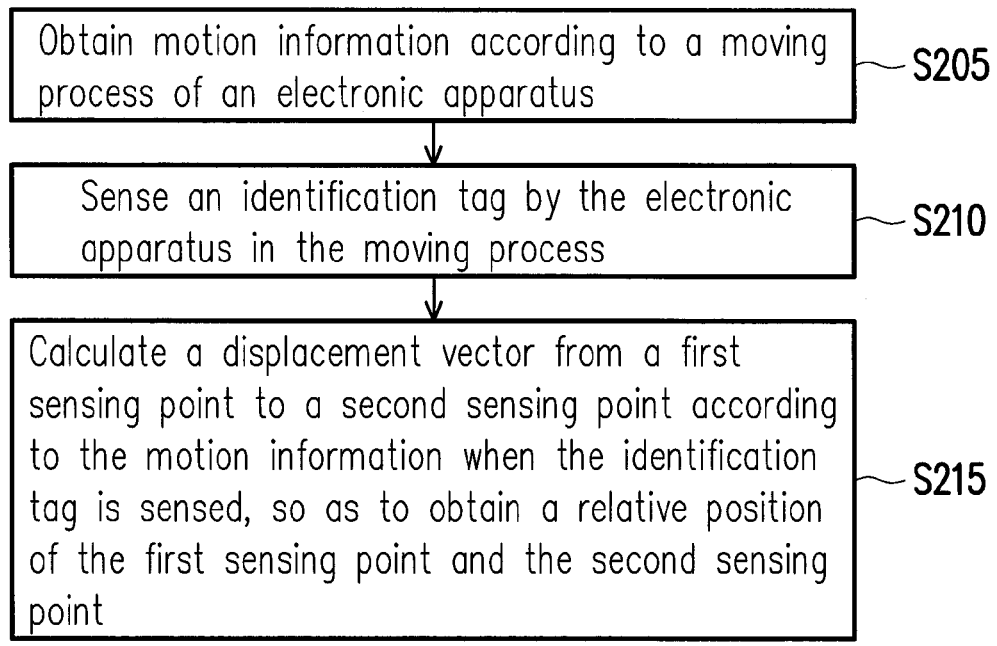
FIG. 2 is a flowchart illustrating a method for measuring location according to the first embodiment of the invention.

A method for measuring location is described below with reference of location measuring system 10. FIG. 2 is a flowchart illustrating a method for measuring location according to the first embodiment of the invention. In the present embodiment, when the electronic apparatus 100 moves in the field F, the object identification module 110 respectively senses the identification tags of the objects 11-14, and the motion sensing module 120 is used to obtain motion information (for example, an angular momentum and an acceleration) of the electronic apparatus 100 in the moving process, so as to sequentially estimate relative locations of the objects 11-14.

In step S205, the motion information is obtained according to the moving process of the electronic apparatus 100. For example, the motion sensing module 120 detects an angular momentum and an acceleration of the electronic apparatus 100. Then, the processing unit 130 calculates the moving track T according to the angular momentum and the acceleration. Moreover, a following equation (1) can be used to calculate a location of the electronic apparatus 100 at a time t:

$$P(t)=P(0)+V(0)+\int_0^t [\int_0^t a(t)dt]dt \qquad (1)$$

Where, P(t) is a location of the electronic apparatus 100 at the time point t, P(0) is an initial location of the electronic apparatus 100, V(0) is an initial velocity of the electronic apparatus 100, and a(t) is an acceleration of the electronic apparatus 100 at the time point t.

Then, in step S210, in the moving process, the electronic apparatus 100 senses the identification tag. For example, the electronic apparatus 100 determines whether the identification tag is sensed through the object identification module 110. For example, the object identification module 110 sends a frequency, and if an identification tag exists within a transmission range (for example, smaller than or equal to 10 cm) of the frequency, the identification tag transmits back a response to the object identification module 110 after receiving the frequency. Now, the object identification module 110 determines that the identification tag is sensed. Selection of the aforementioned frequency can be determined according to a distance between the object identification module 110 and the identification tag, for example, lower frequency represents a shorter transmission range.

Then, after the identification tag is sensed, a step S215 is executed, by which the processing unit 130 calculates a displacement vector from a first sensing point to a second sensing point according to the motion information, so as to obtain a relative location of the first sensing point and the second sensing point. Here, referring to FIG. 2, a location where the identification tag of the object 11 is sensed is defined as the first sensing point, when the electronic apparatus 100 moves to a location (i.e. the second sensing point) capable of sensing the identification tag of the object 12, the processing unit 130 obtains the displacement vector according to the motion information and calculates the relative location of the first sensing point and the second sensing point. Moreover, after obtaining the relative location, the processing unit 130 can further record the relative location.

In this way, the processing unit 130 can deduce the relative location of the first sensing point and the second sensing point according to the moving track T. Moreover, the processing unit 130 can further deduce a more accurate object location according to the transmission range of the frequency of the object identification module 110 used for sensing the identification tag, and/or a signal strength between the object identification module 110 and the identification tag.

Moreover, an anti-error mechanism can be set to prevent the electronic apparatus 100 from staying at a same location to repeatedly sense the identification tag of a same object. Another embodiment is provided below for descriptions.

Figure 3:
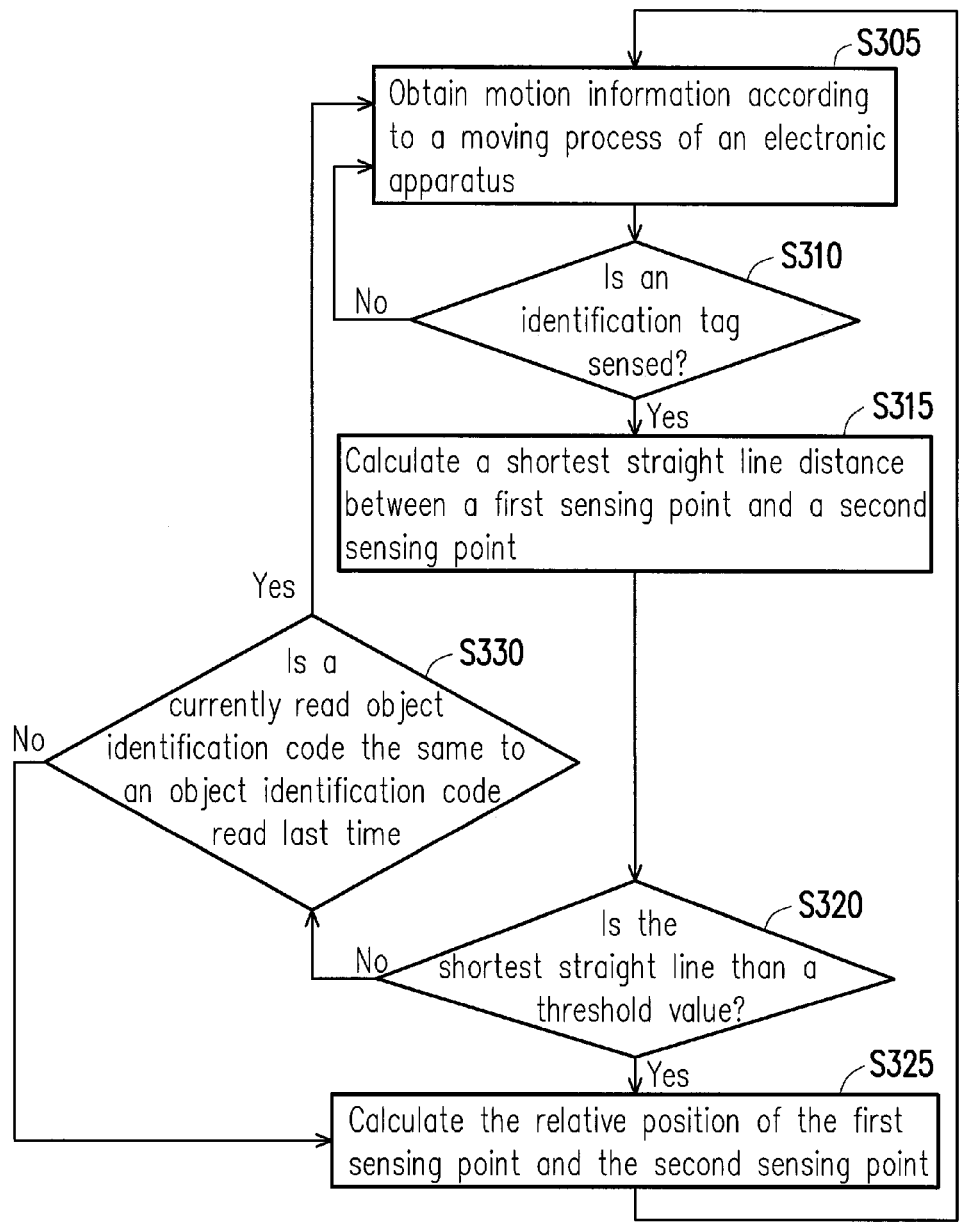
FIG. 3 is a flowchart illustrating another method for measuring location according to the first embodiment of the invention.

FIG. 3 is a flowchart illustrating another method for measuring location according to the first embodiment of the invention. During the moving process of the electronic apparatus 100, in step S305, the motion information is obtained according to the moving process of the electronic apparatus 100. Detailed description of the step S305 can refer to related description of the aforementioned step S205, which is not repeated. Then, in step S310, the object identification module 110 determines whether the identification tag is sensed. How the object identification module 110 determines whether the identification tag is sensed can refer to related description of the aforementioned step S210, which is not repeated. When the identification tag is sensed, a step S315 is executed, otherwise, the step S305 is executed.

In the step S315, when the identification tag is sensed, the processing unit 130 calculates the displacement vector and a shortest straight line distance of the two sensing points, i.e. calculates the shortest straight line distance between the first sensing point and the second sensing point. Here, it is determined whether the electronic apparatus 100 stays at a same location or wanders there around according to the shortest straight line distance of the two sensing points.

Then, in step S320, it is determined whether the shortest straight line distance is greater than a threshold value. In case that the shortest straight line distance is greater than the threshold value, it represents that the electronic apparatus 100 does not stay at the same location or wander there around, and a step S325 is executed to calculate a relative location of the first sensing point and the second sensing point. On the other hand, In case that the shortest straight line distance is not greater than the threshold value, it represents that the electronic apparatus 100 probably stays at the same location or wanders there around, and a step S330 is executed to determine whether a currently read object identification code is the same to an object identification code read last time.

If the currently read object identification code is the same to the object identification code read last time, it is determined that the electronic apparatus 100 is not yet moved to a location capable of sensing a next object, and the flow returns to the step S305. If the currently read object identification code is different to the object identification code read last time, it represents that different objects exist within an error range, and the step S325 is executed.

Moreover, when the identification tag is sensed, the identification tag can be further read, so as to obtain the object identification code. Thereafter, the processing unit 130 determines whether the object identification code has been read. If the object identification code is read for the first time, the object identification code is recorded and a corresponding reading times is added. If the object identification code has been read, the corresponding reading times of the object identification code is accumulated. The above step can also be executed before or after the step S325 when a determination result of the step S330 is negative. The reading times of the object identification code are accumulated to serve as a basis for subsequent behaviour analysis.

After the step S325, the flow returns to the step S305 to continually execute the steps S310-S330 until the electronic apparatus 100 stops moving or the aforementioned method for measuring location is disabled.

Two embodiments are further provided below to describe an application of the location measuring system.

Second Embodiment

Figure 4:
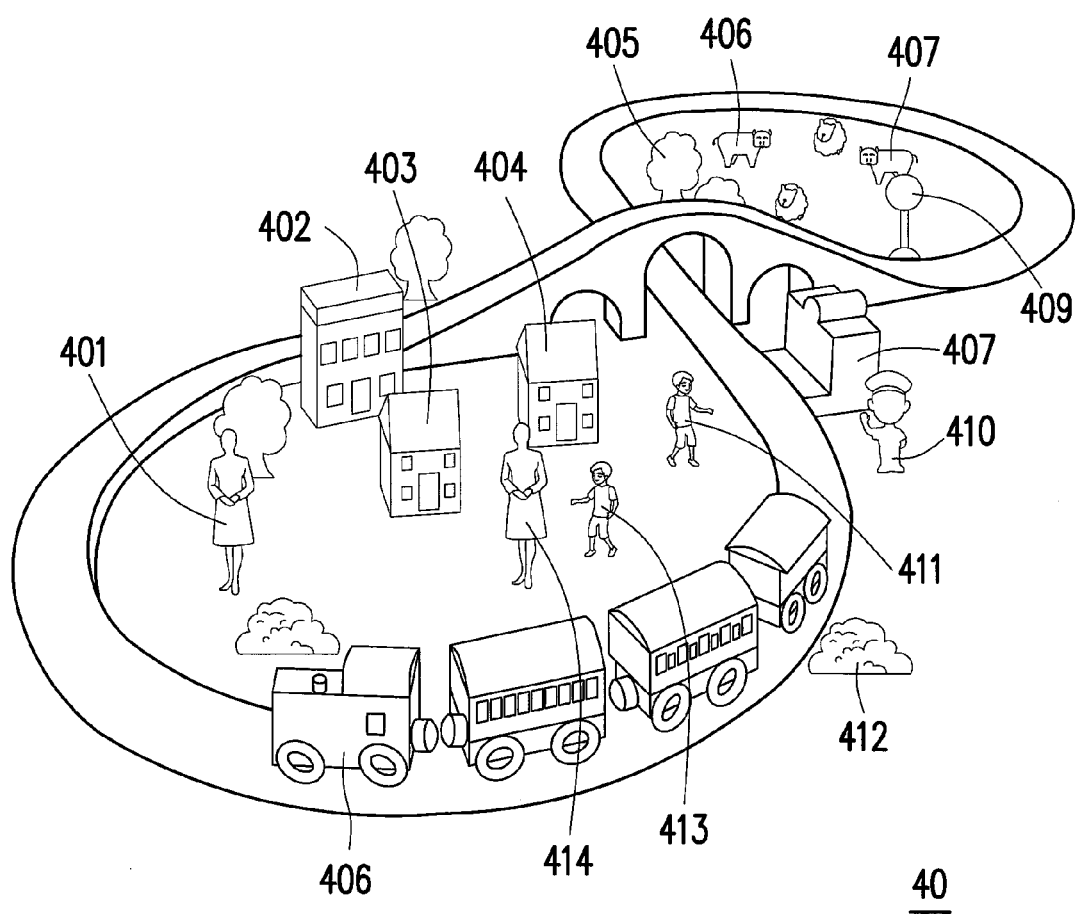
FIG. 4 is a schematic diagram of a location measuring system according to a second embodiment of the invention.

FIG. 4 is a schematic diagram of a location measuring system according to a second embodiment of the invention. In the present embodiment, the location measuring system 10 is, for example, a train game set 40, and the electronic apparatus 100 is, for example, a train main body 400. For example, the object identification module 110, the motion sensing module 120 and the processing unit 130 are disposed in the train main body 400. Identification tags are respectively embedded in each of the objects 401-414 of the train game set 40.

By applying the location measuring system 10 of the first embodiment to the train game set 40, a method for combining and configuring various objects by children in the game process is obtained. By applying the aforementioned method for measuring location (referring to related descriptions of the first embodiment), the conventional train game set that can only unilaterally provide a game learning function to children is ameliorated, i.e. to use the obtained data (the relative location, the moving track, the reading times of the object identification code, etc.) as an analysis basis in children's cognition and learning development, or serve as a reference when the game equipment designer ameliorates the product.

Moreover, in other embodiments, the electronic apparatus 100 can also be designed as a device suitable for being carried by children (i.e. analysand), for example, a watch, a bracelet or a necklace, etc. Moreover, the identification tag can be embedded in each toy (object), and according to the aforementioned method for measuring location, the behaviours of the children are recorded to serve as a reference for subsequent analysis.

Third Embodiment

Figure 5:
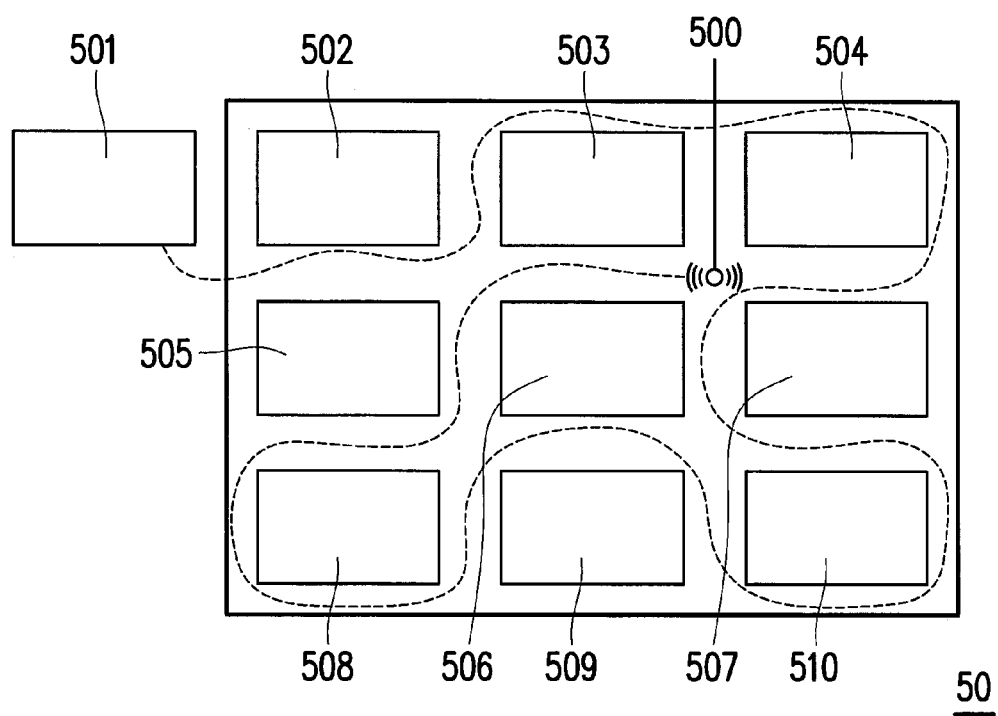
FIG. 5 is a schematic diagram of a location measuring system according to a third embodiment of the invention.

FIG. 5 is a schematic diagram of a location measuring system according to a third embodiment of the invention. In the present embodiment, the location measuring system 10 is, for example, a warehouse management system 50, and the electronic apparatus 100 is, for example, a portable electronic apparatus 500. Moreover, in other embodiments, the electronic apparatus 100 can also be a vehicle.

In the present embodiment, identification tags are respectively embedded in the cargos (objects 501-510). A manager can use the portable electronic apparatus 500 to execute the aforementioned method for measuring location (referring to related description of the first embodiment) to obtain relative distances between the objects 501-510. In this way, complexity of the warehouse management system 50 is decreased, which has an advantage of unlimited field range. Namely, it is unnecessary to emplace a plurality of RFID read/write devices in a selected area, and a location of a specific cargo can be positioned through triangulation or signal strength, etc.

In summary, in the aforementioned embodiment, the object identification technique and the motion sensing technique are combined and applied in different fields to measure locations, so that it is unnecessary to emplace a plurality of signal read/write devices in a selected area, and the technique of the invention is not influenced by signal scattering and signal attenuation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for measuring location provided by a location measuring system, wherein the location measuring system comprises an electronic apparatus comprising a motion sensor, the method comprising:

detecting, by the motion sensor a motion of the electronic apparatus to obtain motion information according to a moving process of the electronic apparatus;

sensing, by a radio frequency identification reader of the electronic apparatus an identification tag by the electronic apparatus in the moving process, wherein the identification tag is set in an object;

when the identification tag is sensed, calculating, by a processor of the electronic apparatus a displacement vector from a first sensing point to a second sensing point according to the motion information and calculating a shortest straight line distance between the first sensing point and the second sensing point, wherein the first sensing point is a location where the identification tag is previously sensed and the second sensing point is a location where the identification tag is currently sensed;

determining by the processor whether the shortest straight line distance is greater than a threshold value, and calculating by the processor the relative location of the first sensing point and the second sensing point in case that the shortest straight line distance is greater than the threshold value; and determining by the processor whether an object identification code of the identification tag is the same to an object identification code read last time in case that the shortest straight line distance is not greater than the threshold value, and calculating by the processor the relative location of the first sensing point and the second sensing point in case that the object identification code of the identification tag is different to the object identification code read last time.

2. The method for measuring location as claimed in claim 1, wherein when the identification tag is sensed, the method further comprises:

reading the identification tag to obtain an object identification code;

determining whether the object identification code has been read;

recording the object identification code and adding a corresponding reading times when the object identification code is read for the first time; and accumulating the reading times corresponding to the object identification code when the object identification code has been read.

3. The method for measuring location as claimed in claim 1, wherein the motion information comprises an angular momentum and an acceleration; and after the step of obtaining the motion information, the method further comprises:

calculating a moving track of the electronic apparatus by the angular momentum and the acceleration.

4. The method for measuring location as claimed in claim 1, further comprising:

recording the relative location of the first sensing point and the second sensing point.

5. An electronic apparatus for measuring location provided by a location measuring system, the electronic apparatus comprising:

a motion sensor, detecting a motion of the electronic apparatus to obtain motion information according to a moving process of the electronic apparatus;

an radio frequency identification reader, determining whether an identification tag is sensed, wherein the identification tag is set in an object; and a processor, coupled to the motion sensor and the radio frequency identification reader, wherein in the moving process, when the radio frequency identification reader senses the identification tag, the processor calculates a displacement vector from a first sensing point to a second sensing point according to the motion information and calculates a shortest straight line distance between the first sensing point and the second sensing point, wherein the first sensing point is a location where the identification tag is previously sensed and the second sensing point is a location where the identification tag is currently sensed, wherein the processor determines whether the shortest straight line distance is greater than a threshold value, and calculates the relative location of the first sensing point and the second sensing point in case that the shortest straight line distance is greater than the threshold value, wherein in case that the shortest straight line distance is not greater than the threshold value, the processor determines whether an object identification code of the identification tag is the same to an object identification code read last time, and calculates the relative location of the first sensing point and the second sensing point in case that the object identification code of the identification tag is different to the object identification code read last time.

6. The electronic apparatus as claimed in claim 5, wherein when the radio frequency identification reader senses the identification tag, the radio frequency identification reader reads the identification tag to obtain an object identification code; the processor determines whether the object identification code has been read; the processor records the object identification code and adds a corresponding reading times when the object identification code is read for the first time; and the processor accumulates the reading times corresponding to the object identification code when the object identification code has been read.

7. The electronic apparatus as claimed in claim 5, wherein the motion information comprises an angular momentum and an acceleration.

8. The electronic apparatus as claimed in claim 5, wherein the processor records the relative location of the first sensing point and the second sensing point.

9. A location measuring system, comprising:

a plurality of objects, distributed in a three-dimensional space and respectively configured with an identification tag; and an electronic apparatus, comprising:

a motion sensor, detecting a motion of the electronic apparatus to obtain motion information according to a moving process of the electronic apparatus;

an radio frequency identification reader, determining whether the identification tag is sensed, wherein the identification tag is set in an object; and a processor, coupled to the motion sensor and the radio frequency identification reader, wherein in the moving process, when the radio frequency identification reader senses the identification tag, the processor calculates a displacement vector from a first sensing point to a second sensing point according to the motion information and calculates a shortest straight line distance between the first sensing point and the second sensing point, wherein the first sensing point is a location where the identification tag is previously sensed and the second sensing point is a location where the identification tag is currently sensed, wherein the processor determines whether the shortest straight line distance is greater than a threshold value, and calculates the relative location of the first sensing point and the second sensing point in case that the shortest straight line distance is greater than the threshold value, wherein in case that the shortest straight line distance is not greater than the threshold value, the processor determines whether an object identification code of the identification tag is the same to an object identification code read last time, and calculates the relative location of the first sensing point and the second sensing point in case that the object identification code of the identification tag is different to the object identification code read last time.

* * * * *